United States Patent
Wu et al.

(10) Patent No.: US 12,302,400 B2
(45) Date of Patent: May 13, 2025

(54) RANDOM ACCESS METHOD, CONFIGURATION METHOD, TERMINAL, AND NETWORK SIDE DEVICE

(71) Applicant: VIVO MOBILE COMMUNICATION CO., LTD., Guangdong (CN)

(72) Inventors: Yumin Wu, Chang'an Dongguan (CN); Wei Bao, Chang'an Dongguan (CN)

(73) Assignee: VIVO COMMUNICATION CO., LTD., Dongguan (CN)

(*) Notice: Subject to any disclaimer, the term of this patent is extended or adjusted under 35 U.S.C. 154(b) by 527 days.

(21) Appl. No.: 17/589,565

(22) Filed: Jan. 31, 2022

(65) Prior Publication Data
US 2022/0159735 A1 May 19, 2022

Related U.S. Application Data

(63) Continuation of application No. PCT/CN2020/107386, filed on Aug. 6, 2020.

(30) Foreign Application Priority Data

Aug. 6, 2019 (CN) .......................... 201910722802.6

(51) Int. Cl.
*H04W 74/0833* (2024.01)
*H04W 74/00* (2009.01)

(52) U.S. Cl.
CPC ..... *H04W 74/0833* (2013.01); *H04W 74/004* (2013.01)

(58) Field of Classification Search
None
See application file for complete search history.

(56) References Cited

U.S. PATENT DOCUMENTS

2018/0110074 A1  4/2018  Akkarakaran et al.
2018/0110075 A1  4/2018  Ly et al.
(Continued)

FOREIGN PATENT DOCUMENTS

CN  105101454 A  11/2015
CN  109511156 A  3/2019
(Continued)

OTHER PUBLICATIONS

Nokia et al., "Data transmission in INACTIVE," 3GPP TSG-RAN WG2 Meeting #96, R2-167706, pp. 1-7, (Nov. 14, 2016).
(Continued)

*Primary Examiner* — Walter J Divito
(74) *Attorney, Agent, or Firm* — BROOKS KUSHMAN P.C.

(57) ABSTRACT

The present disclosure provides a random access method, a configuration method, a terminal, and a network side device. The random access method includes: sending random access request information corresponding to a first random access process type on a first random access request resource, where the first random access process type corresponds to the first random access request resource; the first random access process type is a random access process type selected by a terminal from N configured random access process types, the N random access process types include at least a random access process in which user plane data can be sent or received, and N is an integer greater than 1; and the first random access request resource is a random access request resource selected by the terminal from random access request resources corresponding to the N configured random access process types.

14 Claims, 4 Drawing Sheets

(56) References Cited

U.S. PATENT DOCUMENTS

| | | | |
|---|---|---|---|
| 2019/0174549 A1 | 6/2019 | Xu et al. | |
| 2019/0223221 A1 | 7/2019 | Johansson et al. | |
| 2019/0320467 A1 | 10/2019 | Freda et al. | |
| 2019/0357265 A1 | 11/2019 | Ren et al. | |
| 2020/0178317 A1* | 6/2020 | Wang | H04W 76/19 |
| 2020/0221503 A1 | 7/2020 | Kusashima et al. | |
| 2022/0060974 A1 | 2/2022 | Zeng et al. | |

FOREIGN PATENT DOCUMENTS

| | | |
|---|---|---|
| CN | 109845378 A | 6/2019 |
| CN | 110063085 A | 7/2019 |
| KR | 20190065297 A | 6/2019 |
| WO | 2018/064367 A1 | 4/2018 |
| WO | 2018/086600 A1 | 5/2018 |
| WO | 2018/127239 A1 | 7/2018 |
| WO | 2018/175809 A1 | 9/2018 |
| WO | 2019/064768 A1 | 4/2019 |

OTHER PUBLICATIONS

Samsung, "NR Random Access Summary and Impact on RAN4 RRM Specification," 3GPP TSG-RAN WG4 Meeting #85 #101, R4-1712240, pp. 1-7, (Nov. 27, 2017).

Qualcomm, "Signaling aspect of prioritized random access," 3GPP TSG-RAN WG2 Meeting #101, R2-1803568, pp. 1-5, (Feb. 26, 2018).

OPPO, "RACH initialization and resource selection for 2-step RACH," 3GPP TSG-RAN WG2 Meeting #106, R2-1905601, pp. 1-4, (May 13, 2019).

InterDigital, "On fall back to 4-step RA," 3GPP RAN WG2 Meeting #106, R2-1906406, pp. 1-3, (May 3, 2019).

Vivo, "Differentiation Between 2-step and 4-step RACH," 3GPP TSG-RAN WG2 Meeting #106, R2-1905654, pp. 1-3, (May 13, 2019).

Written Opinion of the International Searching Authority dated Nov. 10, 2020 as received in Application No. PCT/CN2020/107386.

Huawei et al., "Small data transmission with RA-based schemes," 3GPP TSG-RAN WG2 #113-e, R2-2101214, pp. 1-11, (Jan. 25, 2021).

CN Office Action dated Oct. 26, 2021 as received in Application No. 201910722802.6.

Extended European Search Report dated Jul. 11, 2022 as received in Application No. 20850330.0.

Vivo "Fallback Procedure from 2-step RACH to 4-step RACH" 3GPP TSG-RAN WG2 Meeting #106 R2-1905651, May 13, 2019.

Vivo., "Discussion on the MsgA resource selection," 3GPP TSG-RAN WG2 Meeting #106, R2-1905655, pp. 1-7, (May 2019).

CN Office Action dated Sep. 30, 2022 as received in Application No. 201910722802.6.

Second Office Action for European Application No. 20850330.0, dated Nov. 27, 2024, 10 Pages.

First Office Action for Korean Application No. 10-2022-7006834, dated Oct. 21, 2024, 6 Pages.

LG Electronics Inc. "Random Access Resource selection procedure for 2-step CBRA" 3GPP TSG-RAN WG2 #105bis, Xi'an, China, Apr. 2019, R2-1904947, 3 Pages.

* cited by examiner

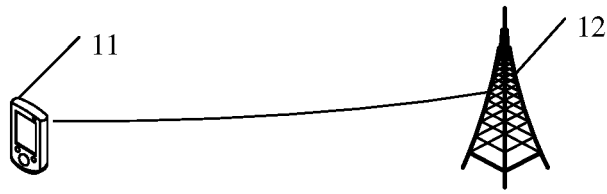

FIG. 1

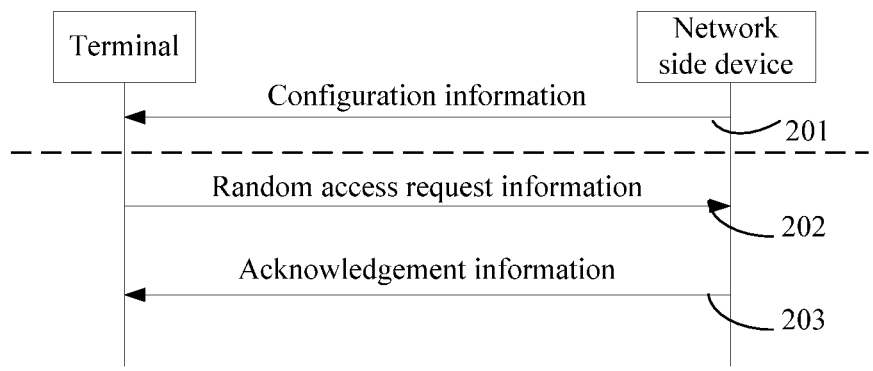

FIG. 2

Send random access request information corresponding to a first random access process type on a first random access request resource, where the first random access process type corresponds to the first random access request resource; the first random access process type is a random access process type selected by a terminal from N configured random access process types, the N random access process types include at least a random access process in which user plane data can be sent or received, and N is an integer greater than 1; and the first random access request resource is a random access request resource selected by the terminal from random access request resources corresponding to the N configured random access process types ⸺301

FIG. 3

Receive random access request information corresponding to a first random access process type on a first random access request resource, where the first random access process type corresponds to the first random access request resource; the first random access process type is a random access process type selected by a terminal from N configured random access process types, the N random access process types include at least a random access process in which user plane data can be sent or received, and N is an integer greater than 1; and the first random access request resource is a random access request resource selected by the terminal from random access request resources corresponding to the N configured random access process types — 401

FIG. 4

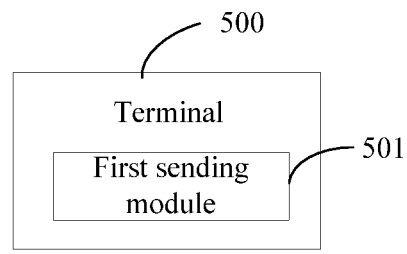

FIG. 5

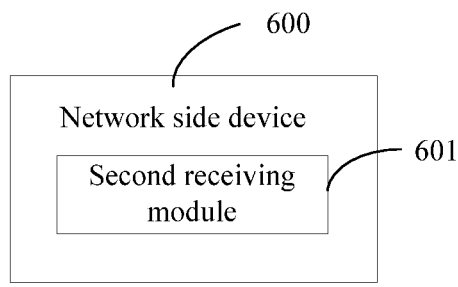

FIG. 6

RANDOM ACCESS METHOD, CONFIGURATION METHOD, TERMINAL, AND NETWORK SIDE DEVICE

CROSS-REFERENCE TO RELATED APPLICATIONS

The present application is a continuation application of International Application No. PCT/CN2020/107386 filed on Aug. 6, 2020, which claims priority to Chinese Patent Application No. 201910722802.6, filed on Aug. 6, 2019 in China, both of which are incorporated herein by reference in their entireties.

TECHNICAL FIELD

Embodiments of the present disclosure relate to the field of communications technologies, and in particular, to a random access method, a configuration method, a terminal, and a network side device.

BACKGROUND

In an idle (IDLE) state or an inactive (INACTIVE) state, a terminal may choose to initiate a 4-step random access process in the related art or a 2-step random access process in the related art to access a network side.

User plane data cannot be sent or received in the 4-step random access process in the related art or the 2-step random access process in the related art. Therefore, for the terminal in the idle state or the inactive state, in a case that the terminal needs to send or receive the user plane data, the user plane data can be sent or received only after access succeeds. If the access fails, the user plane data cannot be sent or received. It can be learned that in the related art, reliability of sending or receiving the user plane data by the terminal in the idle state or the inactive state is relatively low.

SUMMARY

Embodiments of the present disclosure provide a random access method, a configuration method, a terminal, and a network side device, to resolve a problem in the related art that reliability of sending or receiving user plane data by a terminal in an idle state or an inactive state is relatively low.

To resolve the foregoing problem, the present disclosure is implemented as follows:

According to a first aspect, an embodiment of the present disclosure provides a random access method, applied to a terminal. The method includes:
  sending random access request information corresponding to a first random access process type on a first random access request resource, where
  the first random access process type corresponds to the first random access request resource;
  the first random access process type is a random access process type selected by the terminal from N configured random access process types, the N random access process types include at least a random access process in which user plane data can be sent or received, and N is an integer greater than 1; and
  the first random access request resource is a random access request resource selected by the terminal from random access request resources corresponding to the N configured random access process types.

According to a second aspect, an embodiment of the present disclosure provides a configuration method, applied to a network side device. The method includes:
  receiving random access request information corresponding to a first random access process type on a first random access request resource, where
  the first random access process type corresponds to the first random access request resource;
  the first random access process type is a random access process type selected by a terminal from N configured random access process types, the N random access process types include at least a random access process in which user plane data can be sent or received, and N is an integer greater than 1; and
  the first random access request resource is a random access request resource selected by the terminal from random access request resources corresponding to the N configured random access process types.

According to a third aspect, an embodiment of the present disclosure further provides a terminal, and the terminal includes:
  a first sending module, configured to send random access request information corresponding to a first random access process type on a first random access request resource, where
  the first random access process type corresponds to the first random access request resource;
  the first random access process type is a random access process type selected by the terminal from N configured random access process types, the N random access process types include at least a random access process in which user plane data can be sent or received, and N is an integer greater than 1; and
  the first random access request resource is a random access request resource selected by the terminal from random access request resources corresponding to the N configured random access process types.

According to a fourth aspect, an embodiment of the present disclosure further provides a network side device, and the network side device includes:
  a second receiving module, configured to receive random access request information corresponding to a first random access process type on a first random access request resource, where
  the first random access process type corresponds to the first random access request resource;
  the first random access process type is a random access process type selected by the terminal from N configured random access process types, the N random access process types include at least a random access process in which user plane data can be sent or received, and N is an integer greater than 1; and
  the first random access request resource is a random access request resource selected by the terminal from random access request resources corresponding to the N configured random access process types.

According to a fifth aspect, an embodiment of the present disclosure further provides a terminal. The terminal includes a processor, a memory, and a computer program that is stored in the memory and that can be run on the processor, and when the computer program is executed by the processor, the steps of the foregoing random access method are implemented.

According to a sixth aspect, an embodiment of the present disclosure further provides a network side device. The network side device includes a processor, a memory, and a computer program that is stored in the memory and that can be run on the processor, and when the computer program is executed by the processor, the steps of the foregoing configuration method are implemented.

According to a seventh aspect, an embodiment of the present disclosure further provides a computer-readable storage medium. The computer-readable storage medium stores a computer program, and when the computer program is executed by a processor, the steps of the foregoing random access method applied to the terminal are implemented, or the steps of the foregoing configuration method applied to the network side device are implemented.

In the embodiments of the present disclosure, a terminal may choose to initiate a random access process in which user plane data can be sent or received. In this way, even if access of the terminal fails, the terminal may complete sending or receiving of the user plane data, thereby improving reliability of sending or receiving the user plane data by the terminal.

BRIEF DESCRIPTION OF DRAWINGS

To describe the technical solutions in the embodiments of the present disclosure more clearly, the following briefly describes the accompanying drawings required for describing the embodiments of the present disclosures. Apparently, the accompanying drawings in the following description show merely some embodiments of the present disclosure, and a person of ordinary skill in the art may still derive other drawings from these accompanying drawings without creative efforts.

FIG. 1 is a structural diagram of a network system to which the embodiments of the present disclosure can be applied;

FIG. 2 is a schematic diagram of a 2-step random access process according to an embodiment of the present disclosure;

FIG. 3 is a flowchart of a random access method according to an embodiment of the present disclosure;

FIG. 4 is a flowchart of a configuration method according to an embodiment of the present disclosure;

FIG. 5 is a first structural diagram of a terminal according to an embodiment of the present disclosure;

FIG. 6 is a first structural diagram of a network side device according to an embodiment of the present disclosure;

DESCRIPTION OF EMBODIMENTS

Figure 7:
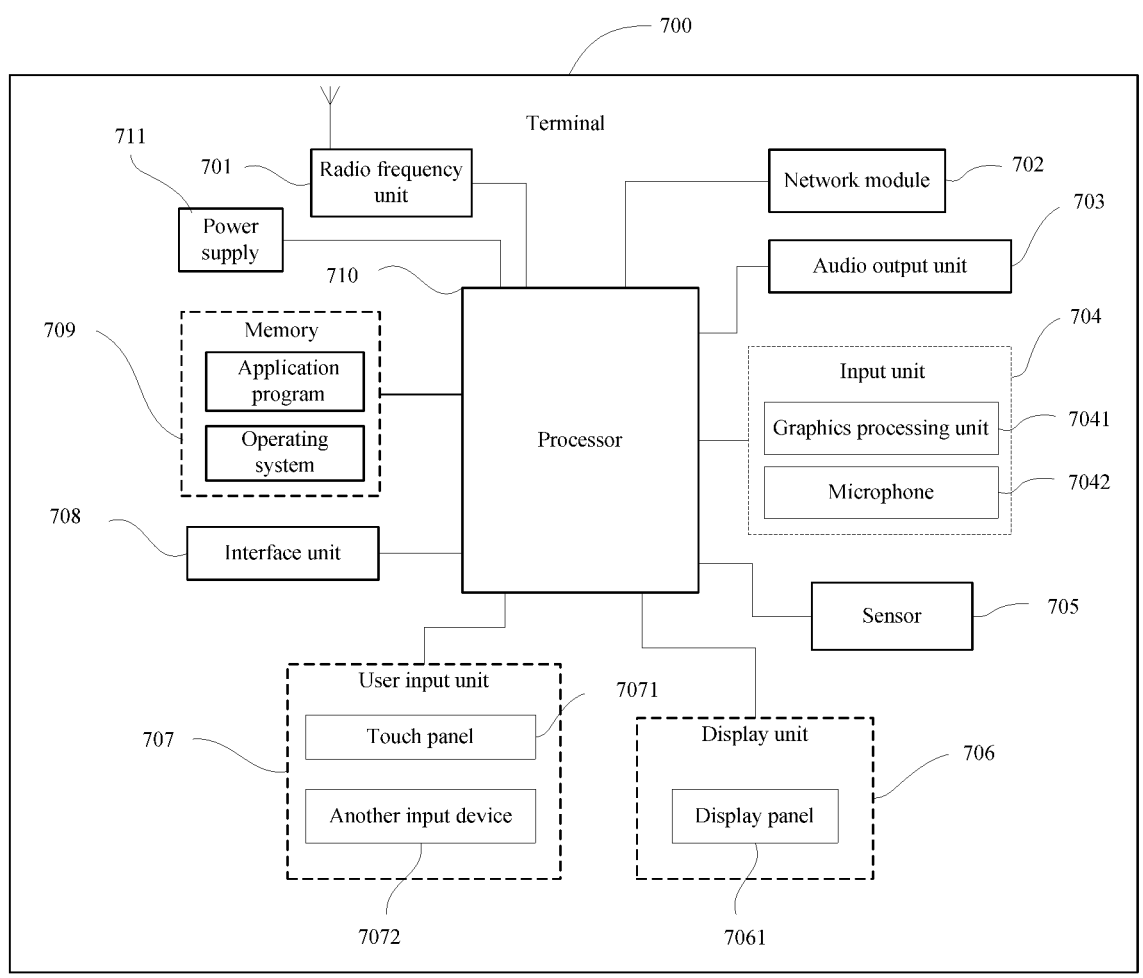
FIG. 7 is a second structural diagram of a terminal according to an embodiment of the present disclosure.

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The terms "first", "second", and the like in this application are intended to distinguish between similar subjects but do not necessarily describe a particular sequence or order. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. In addition, in this application, "and/or" is used to indicate at least one of connected objects, for example, A and/or B and/or C, and to indicate seven cases: only A, only B, only C, A and B, B and C, A and C, and A, B and C.

Referring to FIG. 1, FIG. 1 is a structural diagram of a network system to which the embodiments of the present disclosure can be applied. As shown in FIG. 1, the network system includes a terminal 11 and a network side device 12. Communication may be performed between the terminal 11 and the network side device 12.

In the embodiments of the present disclosure, the terminal 11 may also be referred to as user equipment (User Equipment, UE). In actual application, the terminal 11 may be a mobile phone, a tablet personal computer (Tablet Personal Computer), a laptop computer (Laptop Computer), a personal digital assistant (Personal Digital Assistant, PDA), a mobile Internet device (Mobile Internet Device, MID), a wearable device (Wearable Device), an in-vehicle device, or the like. The network side device 12 may be a base station, a relay, an access point, or the like.

For ease of understanding, the following describes some content in the embodiments of the present disclosure.

1. New 2-step random access (2-Step Random Access Channel, 2-Step RACH).

As shown in FIG. 2, a 2-step random access process may include the following steps.

Step 201: A network side device configures configuration information of new 2-step random access for a terminal, where the configuration information may include sending resource information corresponding to a message (Message, Msg) A and a MsgB.

Then, the terminal triggers the 2-step RACH process to perform step 202.

Step 202: The terminal sends random access request information (MsgA) to the network side device.

In specific implementation, the MsgA may include only a data channel (for example, a physical uplink shared channel (Physical Uplink Shared Channel, PUSCH)), or include both a data channel (for example, a PUSCH) and a control channel (for example, a physical random access channel (Physical Random Access Channel, PRACH)).

Step 203: The network side device sends acknowledgement information (MsgB) to the terminal.

If the terminal fails to receive the MsgB, the terminal resends the MsgA.

2. 4-Step random access process (4-step RACH) in the related art

A random access process of a terminal includes a contention-based random access process (4-step RACH) and a non-contention-based random access process.

For the "contention-based random access process", UE sends a Msg1 (random access request) to a network side. After receiving the Msg1, the network side sends a Msg2 (random access response (Random Access Response, RAR) message) to the UE, where the message carries uplink grant (Uplink Grant) information. The UE generates a MAC protocol data unit (Protocol Data Unit, PDU) based on the uplink grant in the Msg2 and performs a medium access control (Medium Access Control, MAC) layer package function, and stores the MAC PDU in a Msg3 cache. Then the UE sends the MAC PDU in the Msg3 cache by using a hybrid automatic repeat request (Hybrid Automatic Repeat Request, HARQ) process. After receiving the Msg3, the network side sends a Msg4 (for example, a contention resolution identifier) to the UE. The UE receives the Msg4 to determine whether contention resolution succeeds. If the contention resolution succeeds, the random access process succeeds. Otherwise, the random access process is re-initiated. For the re-initiated random access process, after the UE receives the uplink grant in the Msg2 again, the UE directly extracts the previously stored MAC PDU from the Msg3 cache and sends the MAC PDU by using the HARQ process. After completing the random access process, the UE clears a HARQ buffer transmitted by using the Msg3 in the random access process.

The following describes the random access method in the embodiments of the present disclosure.

Referring to FIG. 3, FIG. 3 is a flowchart of a random access method according to an embodiment of the present disclosure. The random access method in this embodiment of the present disclosure is applied to a terminal.

As shown in FIG. 3, the random access method may include the following steps.

Step 301: Send random access request information corresponding to a first random access process type on a first random access request resource.

The first random access process type corresponds to the first random access request resource;
  the first random access process type is a random access process type selected by the terminal from N configured random access process types;
  the first random access request resource is a random access request resource selected by the terminal from random access request resources corresponding to the N configured random access process types.

In this embodiment, the N random access process types may include at least a random access process in which user plane data can be sent or received, and N is an integer greater than 1.

Optionally, the N random access process types may include at least two of the following random access process types:
  a random access process in which user plane data cannot be received or sent;
  a 4-step random access process in which user plane data can be sent in a third message;
  a 4-step random access process in which user plane data can be sent on a data carrier in a third message;
  a 4-step random access process in which user plane data can be sent on a signaling carrier in a third message;
  a 4-step random access process in which user plane data can be received in a fourth message;
  a 4-step random access process in which user plane data can be received on a data carrier in a fourth message;
  a 4-step random access process in which user plane data can be received on a signaling carrier in a fourth message;
  a 2-step random access process in which user plane data can be sent in a first message;
  a 2-step random access process in which user plane data can be sent on a data carrier in a first message;
  a 2-step random access process in which user plane data can be sent on a signaling carrier in a first message;
  a 2-step random access process in which user plane data can be received in a second message;
  a 2-step random access process in which user plane data can be received on a data carrier in a second message; and
  a 2-step random access process in which user plane data can be received on a signaling carrier in a second message.

The random access process in which the user plane data cannot be received or sent may be: a 4-step random access process in which the user plane data cannot be received or sent, for example, a random access process in which the user plane data cannot be sent in a Msg3 through normal 4-step random access; or a 2-step random access process in which the user plane data cannot be received or sent, for example, a random access process in which the user plane data cannot be sent in a MsgA through normal 2-step random access.

In specific implementation, the third message may be a Msg3, the fourth message may be a Msg4, the first message may be a MsgA, and the second message may be a Msg2. The user plane data may include at least one of the following: data radio bearer (Data Radio Bearer, DRB) data; and quality of service flow (Quality of Service Flow, QoS Flow) data.

In addition, optionally, the random access request resources corresponding to the N random access process types may include at least one type of the following resources:
  a time-frequency resource corresponding to a random access request;
  a downlink signal corresponding to a random access request;
  a cell corresponding to a random access request;
  an uplink carrier corresponding to a random access request; and
  a coding resource corresponding to a random access request.

The time-frequency resource may include at least one of the following: a random access resource (RACH Resource, RO) and a PUSCH resource (PO).

The downlink signal may include at least one of the following: a channel state information reference signal (Channel State Information Reference Signal, CSI-RS) and a synchronization signal block (Synchronous Signal Block, SSB).

The uplink carrier may include at least one of the following: a supplementary uplink (Supplementary Uplink, SUL), and a normal uplink (Normal Uplink, NUL).

The coding resource may be a preamble (Preamble) code number range of a PRACH channel In specific implementation, in a first implementation, random access request resources corresponding to different random access process types in the N random access process types may be completely the same.

In a second implementation, random access request resources corresponding to different random access process types in the N random access process types may be completely different, that is, all types of resources in the random access request resources are completely different.

In a third implementation, random access request resources corresponding to different random access process types in the N random access process types may be partially the same and partially different. For example, a random access process type 1 and a random access process type 2 respectively correspond to a same RO, but respectively correspond to different uplink carriers.

According to the random access method in this embodiment, a terminal may choose to initiate a random access process in which user plane data can be sent or received. In this way, even if access of the terminal fails, the terminal may complete sending or receiving of the user plane data, thereby improving reliability of sending or receiving the user plane data by the terminal.

In this embodiment, optionally, before the sending random access request information corresponding to a first random access process type on a first random access request resource, the method further includes:

receiving configuration information, where the configuration information is used to configure the N random access process types and the random access request resources corresponding to the N random access process types.

In specific implementation, the receiving configuration information may be receiving the configuration information sent by a network side device.

It should be noted that, in actual application, before each time the terminal sends the random access request information, the terminal does not necessarily need to receive the configuration information. In other words, after receiving the configuration information, the terminal may send the random access request information for a plurality of times based on the configuration information. In this way, signaling overheads can be reduced.

In this embodiment, optionally, before the sending random access request information on a first random access request resource, the method further includes at least one of the following:

selecting the first random access request resource from the random access request resources corresponding to the N random access process types according to a first selection rule; and selecting the first random access process type from the N random access process types according to a second selection rule.

Further, the selecting the first random access process type from the N random access process types according to a second selection rule may include at least one of the following:

selecting the first random access process type from the N random access process types based on a signal measurement threshold;

selecting the first random access process type from the N random access process types based on a data size;

selecting the first random access process type from the N random access process types based on a random number; and selecting the first random access process type from the N random access process types based on a priority of a random access process type.

For ease of understanding, descriptions are separately provided as follows:

In a first scenario, the first random access process type is selected from the N random access process types based on a signal measurement threshold.

In the first scenario, in an implementation, the terminal may preset the signal measurement threshold and a random access process type corresponding to each result of comparing a signal measurement value with the signal measurement threshold. In this way, the terminal may compare a measured signal measurement value with the signal measurement threshold, and determine the first random access process type based on a random access process type corresponding to a result of the comparison.

For example, it is assumed that a reference signal received power (Reference Signal Received Power, RSRP) threshold of a cell 1 indicated by a network side or specified by a protocol is −80 decibel milliwatt (dBm), a first comparison result corresponds to a random access process type 1, and a second comparison result corresponds to a random access process type 2, where the first comparison result is that an RSRP measurement value of the cell 1 is less than an RSRP measurement threshold of the cell 1, and the second comparison result is that the RSRP measurement value of the cell 1 is greater than or equal to the RSRP measurement threshold of the cell 1. When the RSRP measurement value of the cell 1 exceeds −80 dBm, the terminal selects the random access process type 2 as the first random access process type.

In another implementation, the terminal may preset a signal measurement threshold corresponding to each random access process type. If a signal measurement value is greater than a signal measurement threshold, the terminal may determine the first random access process type based on a random access process type corresponding to the signal measurement threshold.

For example, it is assumed that a signal measurement threshold corresponding to a random access process type 1 is −80 dBm, and a signal measurement threshold corresponding to a random access process type 2 is −90 dBm. If a signal measurement value is −85 dBm, the terminal may use the random access process type 2 as the first random access process type.

In a second scenario, the first random access process type is selected from the N random access process types based on a data size.

In the second scenario, in an implementation, the terminal may preset a threshold of the data size and a random access process type corresponding to each result of comparing a size of to-be-sent or to-be-received data with the threshold of the data size. In this way, the terminal may compare a size of to-be-sent or to-be-received data in a random access process with the threshold of the data size, and determine the first random access process type based on a random access process type corresponding to a result of the comparison.

For example, it is assumed that a threshold of a size of data of a cell 1 indicated by a network side or specified by a protocol is 56 bits (Bit), a first comparison result corresponds to a random access process type 1, and a second comparison result corresponds to a random access process type 2, where the first comparison result is that a size of data to be sent by the terminal in a random access process is less than 56 bits, and the second comparison result is that the size of the data to be sent by the terminal in the random access process is greater than or equal to 56 bits. When the size of the data to be sent by the terminal in the random access process is 60 bits, the terminal selects the random access process type 2 as the first random access process type.

In another implementation, the terminal may preset a threshold of a data size corresponding to each random access process type. If a size of to-be-sent or to-be-received data is greater than a threshold of a data size, the terminal may determine the first random access process type based on a random access process type corresponding to the threshold of the data size.

For example, it is assumed that a threshold of a data size corresponding to a random access process type 1 is 50 bits, and a threshold of a data size corresponding to a random access process type 2 is 70 bits. If the size of the data to be sent by the terminal in the random access process is 60 bits, the terminal may use the random access process type 1 as the first random access process type.

In a third scenario, the first random access process type is selected from the N random access process types based on a random number.

In the third scenario, in an implementation, the terminal may preset a value threshold and a random access process type corresponding to each result of comparing the random number with the value threshold. In this way, the terminal may compare a generated random number with the value threshold, and determine the first random access process type based on a random access process type corresponding to a result of the comparison.

For example, it is assumed that a value threshold of a cell 1 indicated by a network side or specified by a protocol is 0.5, a first comparison result corresponds to a random access process type 1, and a second comparison result corresponds to a random access process type 2, where the first comparison result is that a random number generated by the terminal is less than 0.5, and the second comparison result is that the random number generated by the terminal is greater than or equal to 0.5. When the random number generated by the terminal is 0.6, the terminal selects the random access process type 2 as the first random access process type.

In another implementation, the terminal may preset a value threshold corresponding to each random access process type. If a random number generated by the terminal is greater than a value threshold, the terminal may determine the first random access process type based on a random access process type corresponding to the value threshold.

For example, it is assumed that a value threshold corresponding to a random access process type 1 is 1, and a value threshold corresponding to a random access process type 2 is 2. If the random number of the terminal in the random access process is 1.5, the terminal may use the random access process type 1 as the first random access process type.

In a fourth scenario, the first random access process type is selected from the N random access process types based on a priority of a random access process type.

In the fourth scenario, the terminal may preset a priority corresponding to each random access process type, and select the first random access process type from the N random access process types based on the priority corresponding to each random access process type. Optionally, the terminal may pre-select a random access process type with a highest priority as the first random access process type.

For example, assuming that a priority corresponding to a random access process type 1 is higher than a priority corresponding to a random access process type 2, the terminal may use the random access process type 1 as the first random access process type.

In addition, it should be noted that, in a case that a quantity of random access process types selected by the terminal based on the foregoing one scenario is greater than 1, the terminal may randomly select one random access process type from the plurality of selected random access process types as the first random access process type.

In another manner, the terminal may select the first random access process type from the N random access process types with reference to at least two of the foregoing four scenarios.

For example, the terminal may select the first random access process type from the N random access process types with reference to the first scenario and the second scenario. In other words, the terminal may select the first random access process type from the N random access process types based on a signal measurement threshold and a data size.

For example, it is assumed that an RSRP threshold of a cell 1 indicated by a network side or specified by a protocol is −80 decibel milliwatt (dBm), a first comparison result corresponds to a random access process type 1 and a random access process type 2, and a second comparison result corresponds to a random access process type 3 and a random access process 4, where the first comparison result is that an RSRP measurement value of the cell 1 is less than an RSRP measurement threshold of the cell 1, and the second comparison result is that the RSRP measurement value of the cell 1 is greater than or equal to the RSRP measurement threshold of the cell 1.

It is assumed that a threshold of a size of data of the cell 1 indicated by the network side or specified by the protocol is 56 bits, a third comparison result corresponds to the random access process type 1 and the random access process type 3, and a fourth comparison result corresponds to the random access process type 2 and the random access process 4, where the third comparison result is that a size of data to be sent by the terminal in a random access process is less than 56 bits, and the second comparison result is that the size of the data to be sent by the terminal in the random access process is greater than or equal to 56 bits.

When the RSRP measurement value of the cell 1 exceeds −80 dBm, the terminal may select the random access process type 3 or the random access process type 4 as the first random access process type. In this case, a quantity of random access process types that may be selected by the terminal as the first random access process type is greater than 1.

Therefore, the terminal further determines a result of comparing the size of the data to be sent by the terminal in the random access process with the threshold of the size of the data. Because the size of the data to be sent by the terminal in the random access process is 60 bits, the terminal selects the random access process type 4 as the first random access process type.

The first random access process type selected in the foregoing manner can meet an actual requirement of the terminal, so that resource utilization of the random access process can be improved.

In addition, the selecting the first random access request resource according to the first selection rule is described as follows:

It can be learned from the foregoing content that the random access request resources corresponding to the N random access process types may include one or more types of resources. Similarly, the first random access request resource may also include one or more types of resources. In a case that the first random access request resource includes a plurality of types of resources, the terminal may select all types of resources from the first random access request resource according to the first selection rule.

Optionally, the selecting the first random access request resource from the random access request resources corresponding to the N random access process types according to a first selection rule may include:

selecting the first random access request resource from the random access request resources corresponding to the N random access process types based on a signal measurement threshold.

For ease of understanding, the following uses an example in which an uplink carrier corresponding to a random access request is selected based on the signal measurement threshold for description. A selection principle of another resource is similar, and details are not described herein again.

In specific implementation, in an implementation, the terminal may preset the signal measurement threshold and an uplink carrier that is in the first random access request resource and that is corresponding to each result of comparing a signal measurement value with the signal measurement threshold. In this way, the terminal may compare a measured signal measurement value with the signal measurement threshold, and determine an uplink carrier in the first random access request resource based on an uplink carrier that is in the first random access request resource and that is corresponding to a result of the comparison.

For example, it is assumed that a reference signal received power threshold of a cell 1 indicated by a network side or specified by a protocol is −80 decibel milliwatt (dBm), a first comparison result corresponds to an uplink carrier 1, and a second comparison result corresponds to an uplink carrier 2, where the first comparison result is that an RSRP measurement value of the cell 1 is less than an RSRP measurement threshold of the cell 1, and the second comparison result is that the RSRP measurement value of the cell 1 is greater than or equal to the RSRP measurement threshold of the cell 1. When the RSRP measurement value of the cell 1 exceeds −80 dBm, the terminal selects the uplink carrier 2 as an uplink carrier in the first random access request resource.

In another implementation, the terminal may preset a signal measurement threshold corresponding to each uplink carrier. If a signal measurement value is greater than a signal measurement threshold, the terminal may determine the first uplink carrier based on an uplink carrier corresponding to the signal measurement threshold.

For example, it is assumed that a signal measurement threshold corresponding to an uplink carrier 1 is −80 dBm, and a signal measurement threshold corresponding to an uplink carrier 2 is −90 dBm. If a signal measurement value is −85 dBm, the terminal may use the uplink carrier 2 as an uplink carrier in the first random access request resource.

In some implementations, the terminal may select, based on at least one of a signal measurement threshold, a data size, a random number, and a resource priority, all types of resources in the first random access request resource from the random access request resources corresponding to the N random access process types. A selection principle thereof is similar to that of selecting the first random access process type. For details, refer to the foregoing descriptions of selecting the first random access process type. Details are not described herein again.

The first random access request resource selected in the foregoing manner can meet an actual requirement of the terminal, so that resource utilization of the random access process can be improved.

In actual application, the terminal may select the first random access request resource according to the first selection rule, and/or select the first random access process type according to the second selection rule. Different implementations are described below.

Implementation 1: The terminal selects the first random access request resource according to the first selection rule, and does not select the first random access process type according to the second selection rule.

In implementation 1, after selecting the first random access request resource according to the first selection rule, the terminal may select the first random access process type from a random access process type corresponding to the first random access request resource.

Specifically, if the first random access request resource corresponds to one random access process type, the random access process type may be directly selected as the first random access process type.

If the first random access request resource corresponds to a plurality of random access process types, one random access process type may be randomly selected from the plurality of random access process types as the first random access process type.

It should be noted that, in a case that the first random access request resource includes a plurality of types of resources, random access process types corresponding to the first random access request resource are random access process types corresponding to all types of resources in the first random access request resource.

For example, if the first random access request resource includes an uplink carrier 1 and a downlink signal 1, random access process types corresponding to the uplink carrier 1 include a random access process type 1 and a random access process type 2, and random access process types corresponding to the downlink signal 1 include the random access process type 1 and a random access process type 3, the terminal may use only the random access process type 1 as the first random access process type, and cannot use the random access process type 2 or the random access process type 3 as the first random access process type.

The random access process type selected in implementation 1 certainly corresponds to the selected random access request resource. Therefore, efficiency of selecting a random access process type can be improved.

Implementation 2: The terminal selects the first random access process type according to the second selection rule, and does not select the first random access request resource according to the first selection rule.

In implementation 2, after selecting the first random access process type according to the second selection rule, the terminal may select the first random access request resource from a random access request resource corresponding to the first random access process type.

Specifically, if the random access request resource corresponding to the first random access process type corresponds to one type of resource, the resource may be directly selected.

If the random access request resource corresponding to the first random access process type corresponds to a plurality of types of resources, one resource may be randomly selected from the plurality of resources.

The random access request resource selected in implementation 2 certainly corresponds to the selected random access process type. Therefore, efficiency of selecting a random access request resource can be improved.

Implementation 3: The terminal selects the first random access request resource according to the first selection rule, and selects the first random access process type according to the second selection rule.

In implementation 3, a sequence of selecting the first random access request resource according to the first selection rule and selecting the first random access process type according to the second selection rule may be further specified.

Optionally, the first random access request resource includes M types of resources, and M is a positive integer.

The method further includes any one of the following:

after K types of resources in the first random access request resource are selected according to the first selection rule, selecting the first random access process type from the N random access process types according to the second selection rule, where K is a positive integer less than or equal to M; and after the first random access process type is selected according to the second selection rule, selecting the first random access request resource from the random access request resources corresponding to the N random access process types according to the first selection rule.

For ease of understanding, descriptions are separately provided as follows:

In a first implementation, after the K types of resources in the first random access request resource are selected according to the first selection rule, the first random access process type is selected from the N random access process types according to the second selection rule. That is, the K types of resources are selected first, and then a random access process type is selected.

In a first implementation, optionally, in a case that K is less than M, after the selecting the first random access process type from the N random access process types according to the second selection rule, the method further includes:

selecting a resource in the first random access request resource other than the K types of resources according to the first selection rule.

For ease of understanding, an example in which the first random access resource includes an uplink carrier, a downlink signal, and a coding resource is used for description.

In one manner, after selecting, according to the first selection rule, all resources included in the first random access resource, that is, the uplink carrier, the downlink signal, and the coding resource, the terminal may select the first random access process type from the N random access process types according to the second selection rule.

In another manner, after selecting, according to the first selection rule, a part of resources included in the first random access resource, that is, the uplink carrier, the terminal may select the first random access process type from the N random access process types according to the second selection rule, and then select, according to the first selection rule, remaining resources included in the first random access resource, that is, the downlink signal and the coding resource.

In the first implementation, the terminal may select the first random access process type according to the second selection rule in at least the following two manners.

Manner 1: The terminal may directly select the first random access process type from the N random access process types according to the second selection rule. In manner 1, the selection of the first random access process type is independent of the selection of the first random access request resource.

Manner 2: Optionally, the selecting the first random access process type from the N random access process types according to a second selection rule includes: selecting the first random access process type from a random access process type corresponding to the first random access request resource according to the second selection rule.

In manner 2, the selection of the first random access process type is related to a result of the selection of the first random access request resource, and the first random access process type certainly corresponds to the first random access request resource. Therefore, efficiency of selecting the first random access process type can be improved.

In actual application, in manner 1, because selection of a random access process type and selection of a random access request resource are independent of each other, the access process type and the random access request resource selected in manner 1 may not correspond.

In a case that the access process type and the random access request resource selected in the foregoing manner 1 do not correspond, the terminal needs to re-select the random access process type, so that a last selected random access process type corresponds to the first selected random access request resource. Specifically, the random access process type may be re-selected in the foregoing manner 2.

Optionally, before the selecting the first random access process type from a random access process type corresponding to the first random access request resource according to the second selection rule, the method further includes:

selecting a second random access process type from the N random access process types according to the second selection rule; and the selecting the first random access process type from a random access process type corresponding to the first random access request resource according to the second selection rule includes:

in a case that a random access request resource corresponding to the second random access process type does not overlap the K types of resources, selecting the first random access process type from random access process types corresponding to the K types of resources according to the second selection rule.

In specific implementation, if one or more types of resources in the random access request resource corresponding to the second random access process type do not overlap with corresponding resources in the K types of resources, it may be considered that the random access request resource corresponding to the second random access process type does not overlap with the K types of resources.

For example, it is assumed that the K types of resources include an uplink carrier and a downlink signal, the uplink carrier in the K types of resources is an uplink carrier 1, and the downlink signal is a downlink signal 1; and an uplink carrier in the random access request resource corresponding to the second random access process type is an uplink carrier 2, and a downlink signal is a downlink signal 1. The terminal may consider that the random access request resource corresponding to the second random access process type does not overlap the K types of resources.

In a second implementation, after the first random access process type is selected according to the second selection rule, selecting the first random access request resource from the random access request resources corresponding to the N random access process types according to the first selection rule. That is, a random access process type is selected first, and then a random access request resource is selected.

In the second implementation, the terminal may select the first random access request resource according to the first selection rule in at least the following two manners.

Manner 1: The terminal may directly select the first random access request resource from the random access request resources corresponding to the N random access process types according to the first selection rule. In manner 1, the selection of the first random access process type is independent of the selection of the first random access request resource.

Manner 2: Optionally, the selecting the first random access request resource from the random access request resources corresponding to the N random access process types according to a first selection rule includes: selecting the first random access request resource from a random access request resource corresponding to the first random access process type according to the first selection rule.

In manner 2, the selection of the first random access request resource is related to a result of the selection of the first random access process type, and the first random access request resource certainly corresponds to the first random access process type. Therefore, efficiency of selecting the first random access request resource can be improved.

In actual application, in manner 1, because selection of a random access process type and selection of a random access request resource are independent of each other, the access process type and the random access request resource selected in manner 1 may not correspond.

In a case that the access process type and the random access request resource selected in the foregoing manner 1 do not correspond, the terminal needs to re-select the random access request resource, so that a last selected random access request resource corresponds to the first selected random access process type. Specifically, the random access request resource may be re-selected in the foregoing manner 2.

Optionally, before the selecting the first random access request resource from a random access request resource corresponding to the first random access process type according to the first selection rule, the method further includes:

selecting a second random access request resource from the random access request resources corresponding to the N random access process types according to the first selection rule; and the selecting the first random access request resource from a random access request resource corresponding to the first random access process type according to the first selection rule includes:

in a case that the second random access request resource does not overlap the random access request resource corresponding to the first random access process type, select the first random access request resource from the random access request resource corresponding to the first random access process type according to the first selection rule.

In specific implementation, in a case that one or more types of resources in the second random access request resource do not overlap with corresponding resources in the random access request resource corresponding to the first random access process type, it may be considered that the second random access request resource does not overlap with the random access request resource corresponding to the first random access process type.

For example, assuming that an uplink carrier in the second random access request resource is an uplink carrier 2, a downlink signal is a downlink signal 1, and an uplink carrier in the random access request resource corresponding to the first random access process type is an uplink carrier 1, and a downlink signal is a downlink signal 1, it may be considered that the second random access request resource does not overlap the random access request resource corresponding to the first random access process type.

Referring to FIG. 4, FIG. 4 is a flowchart of a configuration method according to an embodiment of the present disclosure. The configuration method in this embodiment of the present disclosure is applied to a network side device.

As shown in FIG. 4, the configuration method may include the following steps.

Step 401: Receive random access request information corresponding to a first random access process type on a first random access request resource.

The first random access process type corresponds to the first random access request resource;

the first random access process type is a random access process type selected by a terminal from N configured random access process types, the N random access process types include at least a random access process in which user plane data can be sent or received, and N is an integer greater than 1; and the first random access request resource is a random access request resource selected by the terminal from random access request resources corresponding to the N configured random access process types.

Optionally, before the receiving random access request information corresponding to a first random access process type on a first random access request resource, the method further includes:

sending configuration information, where the configuration information is used to configure the N random access process types and the random access request resources corresponding to the N random access process types.

Optionally, the random access request resources corresponding to the N random access process types include at least one type of the following resources:

a time-frequency resource corresponding to a random access request;

a downlink signal corresponding to a random access request;

a cell corresponding to a random access request;

an uplink carrier corresponding to a random access request; and a coding resource corresponding to a random access request.

Optionally, the N random access process types include at least two of the following random access process types:

a random access process in which user plane data cannot be received or sent;

a 4-step random access process in which user plane data can be sent in a third message;

a 4-step random access process in which user plane data can be sent on a data carrier in a third message;

a 4-step random access process in which user plane data can be sent on a signaling carrier in a third message;

a 4-step random access process in which user plane data can be received in a fourth message;

a 4-step random access process in which user plane data can be received on a data carrier in a fourth message;

a 4-step random access process in which user plane data can be received on a signaling carrier in a fourth message;

a 2-step random access process in which user plane data can be sent in a first message;

a 2-step random access process in which user plane data can be sent on a data carrier in a first message;

a 2-step random access process in which user plane data can be sent on a signaling carrier in a first message;

a 2-step random access process in which user plane data can be received in a second message;

a 2-step random access process in which user plane data can be received on a data carrier in a second message; and a 2-step random access process in which user plane data can be received on a signaling carrier in a second message.

According to the configuration method in this embodiment, configuration information may be used to configure N random access process types including at least a random access process in which user plane data can be sent or received. In this way, a terminal may choose to initiate the random access process in which the user plane data can be sent or received. Even if access of the terminal fails, the terminal may complete sending or receiving of the user plane data, thereby improving reliability of sending or receiving the user plane data by the terminal.

It should be noted that this embodiment is used as an implementation of the network side device corresponding to the foregoing method embodiment. Therefore, reference may be made to the related descriptions in the foregoing method embodiment, and a same beneficial effect can be achieved. To avoid repeated descriptions, details are not described herein again.

It should be noted that the plurality of optional implementations described in this embodiment of the present disclosure may be implemented in combination with each other, or may be separately implemented. This is not limited in this embodiment of the present disclosure.

For ease of understanding, an example is described as follows:

Step 1: A network side configures corresponding random access request resource configuration information based on a random access process type. "Different types of random access processes" include at least two of the following:

a random access process type 1: sending data in a third message in a 4-step random access process;

a random access process type 2: sending data in a first message (for example, a MsgA) in a 2-step random access process;

a random access process type 3: receiving data in a fourth message in a 4-step random access process;

a random access process type 4: receiving data in a second message (for example, a MsgB) in a 2-step random access process; and a random access process type 5: a normal random access process (for example, normal 4-step random access (that is, a random access process in which user plane data cannot be sent in a Msg3); and normal 2-step random access (that is, a random access process in which user plane data cannot be sent in a MsgA).

Types of random access processes corresponding to the "random access process type 1" and the "random access process type 2" may be classified into:

a random access process type 6: UE sends data by using a data bearer (for example, a data radio bearer (Data Radio Bearer, DRB)); and a random access process type 7: UE sends data by using a signaling bearer (for example, a data radio bearer (Signaling Radio Bearer, SRB)).

It should be understood that the random access process type 6 and the random access process type 7 are subtypes of the "random access process type 1" and the "random access process type 2".

Types of random access processes corresponding to the "random access process type 3" and the "random access process type 4" may be classified into:

a random access process type 8: receiving data by using a data bearer (for example, a DRB); and a random access process type 9: receiving data by using a signaling bearer (for example, an SRB).

It should be understood that the random access process type 8 and the random access process type 9 are subtypes of the "random access process type 3" and the "random access process type 4".

Data sent by using the "random access process type 1" and the "random access process type 2" (and/or data received by using the "random access process type 3" and the "random access process type 4") may be further specified as user plane data of the UE (for example, DRB data and/or QoS flow data).

For the foregoing method, the "random access request resource configuration information" includes at least one of the following:

a time-frequency resource (for example, an RO1 or a PO1) corresponding to a random access request;

a downlink signal (for example, a CSI-RS-1 and/or an SSB-1) corresponding to a random access request;

a cell (for example, a cell-1) corresponding to a random access request; an uplink carrier (for example, an SUL or an NUL) corresponding to a random access request; and a coding resource (for example, a preamble code number range [1, 10] of a PRACH channel) corresponding to a random access request.

"Random access request resource configuration information" corresponding to different "random access process types" may be the same, different, or partially the same.

For example, content of "random access request resource configuration information" corresponding to different "random access process types" is completely the same.

For example, content of each information item in content of "random access request resource configuration information" corresponding to different "random access process types" is completely different.

For example, content of information items in content of "random access request resource configuration information" corresponding to different "random access process types" is partially the same (or partially different). For example, corresponding RO (or PO) resources are different; or corresponding downlink signals are different; or corresponding cells are different; or corresponding uplink carriers are different; or corresponding preamble code number ranges of PRACH channels are different.

Step 2: UE triggers a random access process when uplink (or downlink) data is sent (or received) based on the configuration information in step 1, and the UE needs to select a random access process type. In this case, a sequence rule in which the UE selects the random access process type in the random access process is at least one of the following:

Rule 1.1 (Select a carrier first and then a random access process type): When a random access resource is configured on a plurality of uplink carriers of one cell (and a random access resource selection rule of the plurality of uplink carriers is configured), and the random access resource is configured for different random access process types (and a random access process type selection rule is configured), the UE first selects a carrier corresponding to a random access process, and then selects a random access process type corresponding to the random access process.

For example, the "random access resource selection rule of the plurality of uplink carriers" configured by the network is that selection is performed based on a signal measurement threshold (for example, a threshold is −80 dBm), and the "random access process type selection rule" is that a random access process type 1 is selected if a size of uplink sent data is less than or equal to a threshold, and otherwise, a random access process type 5 is selected. The threshold of the uplink data in the random access process is 56 bits.

In the random access process, the UE first selects, according to the "random access resource selection rule of the plurality of uplink carriers" configured by the network, an uplink carrier used for sending a random access signal (for example, if an RSRP measurement value of a cell 1 of the UE is −60 dBm, the UE selects a carrier 1), and then selects a random access process type 1 as the random access process according to the "random access process type selection rule" configured by the network if a size of a Msg3 in the random access process of the UE is 50 bits.

Rule 1.2 (Select a random access process type first and then a carrier): When a random access resource is configured on a plurality of uplink carriers of one cell (and a random access resource selection rule of the plurality of uplink carriers is configured), and the random access resource is configured for different random access process types (and a random access process type selection rule is configured), the UE first selects a random access process type corresponding to a random access process, and then selects a carrier corresponding to the random access process.

For example, the "random access resource selection rule of the plurality of uplink carriers" configured by the network is that selection is performed based on a signal measurement threshold (for example, a threshold is −80 dBm), and the "random access process type selection rule" is that a random access process type 1 is selected if a size of uplink sent data is less than or equal to a threshold, and otherwise, a random access process type 5 is selected. The threshold of the uplink data in the random access process is 56 bits.

In the random access process, the UE first selects a random access process type 1 as the random access process according to the "random access process type selection rule" configured by the network if a size of a Msg3 in the random access process of the UE is 50 bits. Then, an uplink carrier used for sending a random access signal is selected according to the "random access resource selection rule of the plurality of uplink carriers" configured by the network (for example, if an RSRP measurement value of a cell 1 of the UE is −60 dBm, the UE selects a carrier 1).

Rule 2.1 (Select a signal first and then a random access process type): When a random access resource is configured with a corresponding signal (and a signal selection rule is configured), and the random access resource is configured for different random access process types (and a random access process type selection rule is configured), the UE first selects a signal corresponding to the random access process, and then selects a random access process type corresponding to the random access process.

For example, the "signal selection rule" configured by the network is that selection is performed based on a measurement threshold of an SSB signal (for example, a threshold is −80 dBm), and the "random access process type selection rule" is that a random access process type 1 is selected if a size of uplink sent data is less than or equal to a threshold, and otherwise, a random access process type 5 is selected. For example, the threshold of the uplink data in the random access process is 56 bits.

In the random access process, the UE first selects, according to the "signal selection rule" configured by the network, a signal corresponding to the random access resource (for example, if an RSRP measurement value of an SSB 1 of a cell 1 of the UE is −60 dBm, the UE selects the SSB 1), and then selects a random access process type 1 as the random access process according to the "random access process type selection rule" configured by the network if a size of a Msg3 in the random access process of the UE is 50 bits.

Rule 2.2 (Select a random access process type first and then a signal): When a random access resource is configured with a corresponding signal (and a signal selection rule is configured), and the random access resource is configured for a new 2-step random access process and a 4-step random access resource in the related art (and a random access process type selection rule is configured), the UE first selects a random access process type corresponding to a random access process, and then selects a signal corresponding to the random access process.

For example, the "signal selection rule" configured by the network is that selection is performed based on a signal measurement threshold (for example, a threshold is −80 dBm), and the "random access process type selection rule" is that a random access process type 1 is selected if a size of uplink sent data is less than or equal to a threshold, and otherwise, a random access process type 5 is selected. The threshold of the uplink data in the random access process is 56 bits.

In the random access process, the UE first selects a random access process type 1 as the random access process according to the "random access process type selection rule" configured by the network if a size of a Msg3 in the random access process of the UE is 50 bits. Then, the "signal selection rule" configured by the network is that the signal corresponding to the random access resource is selected (for example, if an RSRP measurement value of an SSB 1 of a cell 1 of the UE is −60 dBm, the UE selects the SSB 1).

Rule 3.1 (Select a random access request resource (for example, an RO and/or a PO) first and then a random access process type): When different random access process types are configured with a same RO (and/or PO), but different coding resources are configured (for example, preamble number ranges of PRACHs are different), the UE first selects a random access request resource (for example, an RO and/or a PO) corresponding to a random access process, and then selects a random access process type corresponding to the random access process.

For example, a random access process type 1 and a random access process type 5 configured by the network correspond to a same RO, a preamble code number [0, 10] of a PRACH is used for the random access process type 1, a preamble code number [11, 20] of a PRACH is used for the random access process type 5, and a "random access process type selection rule" is that the random access process type 1 is selected if a size of uplink sent data is less than or equal to a threshold, and otherwise, the random access process type 5 is selected. The threshold of the uplink data in the random access process is 56 bits.

In the random access process, the UE first selects a particular RO (for example, an RO 1) based on an RO resource configured by the network, and the UE selects the random access process type 1 as the random access process according to the "random access process type selection rule" configured by the network if a size of a Msg3 in the random access process of the UE is 50 bits.

Rule 3.2 (Select a random access process type first and then a random access request resource (for example, an RO and/or a PO)): Different random access process types are configured with a same RO (and/or PO), but different coding resources are configured (for example, a random access process type 1 and a random access process type 5 configured by the network correspond to a same RO, a preamble code number [0, 10] of a PRACH is used for the random access process type 1, and a preamble code number [11, 20] of a PRACH is used for the random access process type 5), and a "random access process type selection rule" is that the random access process type 1 is selected if a size of uplink sent data is less than or equal to a threshold, and otherwise, the random access process type 5 is selected (for example, the threshold of the uplink data in the random access process is 56 bits). In the random access process, the UE first selects a random access process type 1 as the random access process according to the "selection rule of the random access process type" configured by the network if a size of a Msg3 in the random access process of the UE is 50 bits. A particular RO (for example, an RO1) is then selected based on an RO resources configured by the network.

One of the rule 1.1 and the rule 1.2 is selected; one of the rule 2.1 and the rule 2.2 is selected; and one of the rule 3.1 and the rule 3.2 is selected.

The "random access resource selection rule of the plurality of uplink carriers" includes performing selection based on the "signal measurement threshold" (for example, an RSRP measurement threshold of two uplink carriers of a cell 1 is −80 dBm, and an uplink carrier 1 is used when an RSRP measurement result of the cell 1 exceeds the threshold, and otherwise, an uplink carrier 2 is used.

The "signal selection rule" includes performing selection based on the "signal measurement threshold" (for example, if an RSRP measurement threshold of an SSB of a cell 1 is −80 dBm, and the UE selects an SSB 1 when an measurement result of the SSB 1 of the cell 1 exceeds the threshold (that is, a random access resource corresponding to the SSB 1 is used as a candidate random access resource)).

The "random access process type selection rule" is configured by the network or specified by the protocol.

The "random access process type selection rule" includes at least one combination of the following:

performing selection based on an RSRP signal measurement threshold (for example, a measurement threshold (such as −80 dBm) of a cell 1 (or an SSB 1 or a CSI-RS 1) indicated by the network side or specified by the protocol, where the UE selects a random access process type 1 when the RSRP measurement threshold of the cell 1 (or the SSB 1 or the CSI-RS 1) exceeds −80 dBm, and otherwise, selects a random access process type 5);

performing selection based on a size of uplink sent data (for example, a threshold (such as 56 bits) of a size of uplink sent data in a random access process of a cell 1 indicated by the network side or specified by the protocol, where the UE selects a random access process type 1 when a size of a connection establishment access request message sent by the UE in the random access process (or a MsgA in a 2-step random access process or a Msg3 in a 4-step random access process) is less than or equal to the threshold, and otherwise, selects a random access process type 5);

performing selection based on a signal measurement threshold and a size of uplink sent data (for example, an RSRP threshold (such as −80 dBm) of a cell 1 (or an SSB 1 or a CSI-RS 1) indicated by the network side or specified by the protocol and a threshold (such as 56 bits) of a size of uplink sent data in a random access process of the cell 1, when the UE selects a random access process type 1 when the RSRP measurement threshold of the cell 1 (or the SSB 1 or the CSI-RS1) UE in the random access process exceeds −80 dBm and a size of a connection establishment access request message (for example, a MsgA in a 2-step random access process or a Msg3 in a 4-step random access process in the related art) sent in the random access process is less than or equal to the threshold, and otherwise, selects a random access process type 5 in the related art);

performing selection based on a random number (for example, the UE generates a random number between "0" and "1", and the UE selects a random access process type 1 when the random number is less than a specified threshold (for example, 0.5), and otherwise, selects a random access process type 5); and performing selection based on a specified preferential random access process type (for example, the UE preferentially selects, based on an indication of the network side or specification in the protocol, a random access process type 1 for a random access process in which data is sent).

Further, a random access resource selection rule is obtained by randomly combining the rule 1 (1.1 or 1.2), the rule 2 (2.1 or 2.2), and the rule 3 (3.1 or 3.2). A specific selection rule is the same as above. Details are not repeatedly described herein.

For example, rule 1.1+rule 2.1: The UE first selects a carrier corresponding to a random access resource, then selects a signal corresponding to the random access resource, and then selects a random access process type.

For example, rule 1.1+rule 2.2: The UE first selects a carrier corresponding to a random access resource, then selects a random access process type, and then selects a signal corresponding to the random access resource.

For example, rule 1.2+rule 2.1: The UE first selects a signal corresponding to a random access resource, then selects a random access process type, and then selects a carrier corresponding to the random access resource.

For example, rule 1.2+rule 2.2: The UE first selects a random access process type corresponding to a random access resource, then selects a carrier corresponding to the random access resource, and then selects a signal corresponding to the random access resource. (Alternatively, the UE first selects a random access process type, then selects a signal corresponding to a random access resource, and then selects a carrier corresponding to the random access resource).

Still further, for rule 1.1, when the UE selects a plurality of carriers according to the "random access resource selection rule of the plurality of uplink carriers" (for example, the UE is configured with three uplink carriers, an RSRP measurement threshold of a cell is −80 dBm, an RSRP measurement result of a cell measured by the UE is −60 dBm, and there are two carrier that exceed the threshold and that may be used for sending a random access signal), the random access resource selection rule of the UE further includes any one of the following:

The UE first selects a random access resource corresponding to a corresponding random access process according to the "random access process type selection rule", and if the random access resource of the UE still corresponds to a plurality of carriers, the UE selects one of the carriers; and the UE first selects one of the carriers, and then selects the corresponding random access process type according to the "random access process type selection rule".

Still further, for rule 1.2, when the UE selects the random access resource corresponding to the random access process type according to the "random access process type selection rule", if the random access resource corresponds to one carrier, the random access resource selection rule of the UE further includes:

the UE no longer executes the "random access resource selection rule of the plurality of uplink carriers".

For example, random access resources corresponding to two new random access processes selected by the UE are all on a carrier 1. In this case, the UE does not execute the carrier selection rule.

This is to avoid a case that the carrier 1 is not selected when a measurement result of the cell 1 of the UE is less than a threshold (that is, a rule selection conflict), resulting in a random access process failure.

Still further, for rule 2.1, when the UE selects a plurality of signals according to the "signal selection rule" (for example, if the UE configure random access resources corresponding to three SSBs, and there are two SSBs that exceed an RSRP threshold configured by the network, the UE selects two SSBs), the random access resource selection rule of the UE further includes any one of the following:

The UE first selects a random access resource corresponding to a corresponding random access process according to the "random access process type selection rule", and if the random access resource of the UE still corresponds to a plurality of signals, the UE selects one of the signals; and
the UE first selects one of the signals, and then selects the random access resource corresponding to the corresponding random access process according to the "random access process type selection rule".

If the signal is only used for one of the random access process types (for example, is only used for a random access process type 1), the UE may no longer select the random access resource corresponding to the corresponding random access process according to the "random access process type selection rule".

This is to avoid a case that the UE cannot select a random access resource corresponding to the signal according to the "random access procedure type selection rule" (that is, a rule selection conflict), resulting in a random access process failure.

Still further, for rule 2.2, when the UE selects the random access resource corresponding to the random access process type according to the "random access process type selection rule", if the random access resource corresponds to one signal, the random access resource selection rule of the UE further includes:

The UE no longer executes the "signal selection rule".

For example, a random access resource corresponding to the random access process type 1 selected by the UE corresponds to an SSB 1, and in this case, the UE does not execute the signal selection rule.

This is to avoid a case that the SSB 1 is not selected when a measurement result of the SSB 1 of the cell 1 of the UE is less than a threshold (that is, a rule selection conflict), resulting in a random access process failure.

Still further, if the UE cannot select any carrier according to the foregoing selection rule 1.1 or 1.2 when a random access resource is configured on a plurality of carriers (for example, (a rule conflict), the UE first selects a carrier 1 according to the carrier selection rule, but after the UE executes the random access process type selection rule, a random access resource corresponding to the random access process type selected by the UE is not on the carrier 1), the random access resource selection rule of the UE further includes any one of the following:

The UE performs the "random access resource selection rule of the plurality of uplink carriers" again (that is, ignores the selection result, and performs carrier selection again);
the UE performs the "random access process type selection rule" again (that is, ignores the selection result, and selects a random access process type again); and
the UE selects one carrier (for example, may be a carrier corresponding to any contention-based random access resource).

Still further, if the UE cannot select any random access process type according to the foregoing selection rule 1.1 or 1.2 when a random access resource is configured on a plurality of carriers (for example, (a rule conflict), the UE first selects a carrier 1 according to the carrier selection rule, but after the UE executes the random access process type selection rule, the random access resource corresponding to the random access process type selected by the UE is not on the carrier 1), the random access resource selection rule of the UE further includes any one of the following:

The UE performs the "random access resource selection rule of the plurality of uplink carriers" again (that is, ignores the selection result, and performs carrier selection again);
the UE performs the "random access process type selection rule" again (that is, ignores the selection result, and selects a random access process type again); and
the UE selects one random access process type (for example, may be a random access process type corresponding to any contention-based random access resource).

Still further, if the UE cannot select any signal according to the foregoing selection rule 2.1 or 2.2 when a random access resource is configured with a corresponding signal (for example, (a rule conflict), the UE first selects an SSB 1 according to the signal selection rule, but after the UE executes the random access process type selection rule, a random access resource corresponding to the random access process type selected by the UE does not correspond to the SSB 1), the random access resource selection rule of the UE further includes any one of the following:

The UE performs the "signal selection rule" again (that is, ignores the selection result, and performs signal selection corresponding to a random access resource again);
the UE performs the "random access process type selection rule" again (that is, ignores the selection result, and selects a random access process type again); and
the UE selects a signal corresponding to one random access resource (for example, may be a signal corresponding to any contention-based random access resource).

Still further, if the UE cannot select any random access process type according to the foregoing selection rule 2.1 or 2.2 when a random access resource is configured with a corresponding signal (for example, (a rule conflict), the UE first selects an SSB 1 according to the signal selection rule, but after the UE executes the random access process type selection rule, a random access resource corresponding to the random access process type selected by the UE does not correspond to the SSB 1), the random access resource selection rule of the UE further includes any one of the following:

The UE performs the "signal selection rule" again (that is, ignores the selection result, and performs signal selection corresponding to a random access resource again);
the UE performs the "random access process type selection rule" again (that is, ignores the selection result, and selects a random access process type again); and
the UE selects one random access process type (for example, may be a random access process type corresponding to any contention-based random access resource).

In the foregoing method, after selecting a corresponding random access process type, the UE selects a specific random access request resource from one or more random access request resources corresponding to the random access process type to send random access request information.

For example, if the UE selects a random access procedure type 1, the UE selects a specific PRACH resource on a PRACH resource corresponding to the random access procedure type 1 to send random access request information Msg1.

For example, if the UE selects a random access procedure type 2, the UE selects a specific PRACH resource (and/or a PUSCH resource) on a PRACH resource corresponding to the random access procedure type 2 to send random access request information MsgA.

According to the method in the present disclosure, the UE can be properly controlled to select a random access process in which data is sent, a random access process in which no data is sent, and a random access process in which different types of data are sent, thereby improving resource utilization of a random access process.

Referring to FIG. 5, FIG. 5 is a first structural diagram of a terminal according to an embodiment of the present disclosure. As shown in FIG. 5, a terminal 500 includes:
- a first sending module 501, configured to send random access request information corresponding to a first random access process type on a first random access request resource, where
- the first random access process type corresponds to the first random access request resource;
- the first random access process type is a random access process type selected by the terminal from N configured random access process types, the N random access process types include at least a random access process in which user plane data can be sent or received, and N is an integer greater than 1; and
- the first random access request resource is a random access request resource selected by the terminal from random access request resources corresponding to the N configured random access process types.

Optionally, the terminal 500 further includes:
a first receiving module, configured to receive configuration information before the first sending module 501 sends the random access request information corresponding to the first random access process type on the first random access request resource, where the configuration information is used to configure the N random access process types and the random access request resources corresponding to the N random access process types.

Optionally, the terminal 500 further includes:
a selection module, configured to: before the first sending module 501 sends the random access request information on the first random access request resource, perform at least one of the following:
- selecting the first random access request resource from the random access request resources corresponding to the N random access process types according to a first selection rule; and
- selecting the first random access process type from the N random access process types according to a second selection rule.

Optionally, the first random access request resource includes M types of resources, and M is a positive integer.

The selection module is specifically configured to perform at least one of the following:
- after K types of resources in the first random access request resource are selected according to the first selection rule, selecting the first random access process type from the N random access process types according to the second selection rule, where K is a positive integer less than or equal to M; and
- after the first random access process type is selected according to the second selection rule, selecting the first random access request resource from the random access request resources corresponding to the N random access process types according to the first selection rule.

Optionally, in a case that K is less than M, the selection module is specifically configured to:
- after K types of resources in the first random access request resource are selected according to the first selection rule, select the first random access process type from the N random access process types according to the second selection rule, where K is a positive integer less than or equal to M; and
- select a resource in the first random access request resource other than the K types of resources according to the first selection rule.

Optionally, the selection module is specifically configured to:
- after the K types of resources in the first random access request resource are selected according to the first selection rule, select the first random access process type from a random access process type corresponding to the first random access request resource according to the second selection rule.

Optionally, the selection module is specifically configured to:
- after the K types of resources in the first random access request resource are selected according to the first selection rule, select a second random access process type from the N random access process types according to the second selection rule; and
- in a case that a random access request resource corresponding to the second random access process type does not overlap the K types of resources, select the first random access process type from random access process types corresponding to the K types of resources according to the second selection rule.

Optionally, the selection module is specifically configured to:
- after the first random access process type is selected according to the second selection rule, select the first random access request resource from a random access request resource corresponding to the first random access process type according to the first selection rule.

Optionally, the selection module is specifically configured to:
- after the first random access process type is selected according to the second selection rule, select a second random access request resource from the random access request resources corresponding to the N random access process types according to the first selection rule; and
- in a case that the second random access request resource does not overlap the random access request resource corresponding to the first random access process type, select the first random access request resource from the random access request resource corresponding to the first random access process type according to the first selection rule.

Optionally, the selection module is specifically configured to perform at least one of the following:
- selecting the first random access process type from the N random access process types based on a signal measurement threshold;
- selecting the first random access process type from the N random access process types based on a data size;
- selecting the first random access process type from the N random access process types based on a random number; and
- selecting the first random access process type from the N random access process types based on a priority of a random access process type.

Optionally, the random access request resources corresponding to the N random access process types include at least one type of the following resources:
- a time-frequency resource corresponding to a random access request;

a downlink signal corresponding to a random access request;

a cell corresponding to a random access request;

an uplink carrier corresponding to a random access request; and a coding resource corresponding to a random access request.

Optionally, the N random access process types include at least two of the following random access process types:

a random access process in which user plane data cannot be received or sent;

a 4-step random access process in which user plane data can be sent in a third message;

a 4-step random access process in which user plane data can be sent on a data carrier in a third message;

a 4-step random access process in which user plane data can be sent on a signaling carrier in a third message;

a 4-step random access process in which user plane data can be received in a fourth message;

a 4-step random access process in which user plane data can be received on a data carrier in a fourth message;

a 4-step random access process in which user plane data can be received on a signaling carrier in a fourth message;

a 2-step random access process in which user plane data can be sent in a first message;

a 2-step random access process in which user plane data can be sent on a data carrier in a first message;

a 2-step random access process in which user plane data can be sent on a signaling carrier in a first message;

a 2-step random access process in which user plane data can be received in a second message;

a 2-step random access process in which user plane data can be received on a data carrier in a second message; and a 2-step random access process in which user plane data can be received on a signaling carrier in a second message.

The terminal 500 can implement the processes implemented by the terminal in the method embodiment of the present disclosure and achieve a same beneficial effect. To avoid repetition, details are not described herein again.

Referring to FIG. 6, FIG. 6 is a first structural diagram of a network side device according to an embodiment of the present disclosure. As shown in FIG. 6, a network side device 600 includes:

a second receiving module 601, configured to receive random access request information corresponding to a first random access process type on a first random access request resource, where the first random access process type corresponds to the first random access request resource;

the first random access process type is a random access process type selected by a terminal from N configured random access process types, the N random access process types include at least a random access process in which user plane data can be sent or received, and N is an integer greater than 1; and the first random access request resource is a random access request resource selected by the terminal from random access request resources corresponding to the N configured random access process types.

Optionally, the network side device 600 further includes:

a second sending module, configured to send configuration information before the second receiving module 601 receives the random access request information corresponding to the first random access process type on the first random access request resource, where the configuration information is used to configure the N random access process types and the random access request resources corresponding to the N random access process types.

Optionally, the random access request resources corresponding to the N random access process types include at least one type of the following resources:

a time-frequency resource corresponding to a random access request;

a downlink signal corresponding to a random access request;

a cell corresponding to a random access request;

an uplink carrier corresponding to a random access request; and a coding resource corresponding to a random access request.

Optionally, the N random access process types include at least two of the following random access process types:

a random access process in which user plane data cannot be received or sent;

a 4-step random access process in which user plane data can be sent in a third message;

a 4-step random access process in which user plane data can be sent on a data carrier in a third message;

a 4-step random access process in which user plane data can be sent on a signaling carrier in a third message;

a 4-step random access process in which user plane data can be received in a fourth message;

a 4-step random access process in which user plane data can be received on a data carrier in a fourth message;

a 4-step random access process in which user plane data can be received on a signaling carrier in a fourth message;

a 2-step random access process in which user plane data can be sent in a first message;

a 2-step random access process in which user plane data can be sent on a data carrier in a first message;

a 2-step random access process in which user plane data can be sent on a signaling carrier in a first message;

a 2-step random access process in which user plane data can be received in a second message;

a 2-step random access process in which user plane data can be received on a data carrier in a second message; and a 2-step random access process in which user plane data can be received on a signaling carrier in a second message.

The network side device 600 can implement the processes implemented by the network side device in the method embodiment of the present disclosure and achieve a same beneficial effect. To avoid repetition, details are not described herein again.

Referring to FIG. 7, FIG. 7 is a second structural diagram of a terminal according to an embodiment of the present disclosure. The terminal may be a schematic diagram of a hardware structure of a terminal that implements the embodiments of the present disclosure. As shown in FIG. 7, a terminal 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. It can be understood by a person skilled in the art that, the terminal structure shown in FIG. 7 does not constitute any limitation on the terminal, and the terminal may include more or fewer components than those shown in the figure, or combine some components, or have different component arrangements. In this embodiment of the present disclosure, the terminal includes but is not limited to a mobile phone, a tablet computer, a notebook computer, a palmtop computer, an in-vehicle terminal, a wearable device, a pedometer, and the like.

The radio frequency unit 701 is configured to:
send random access request information corresponding to a first random access process type on a first random access request resource, where
the first random access process type corresponds to the first random access request resource;
the first random access process type is a random access process type selected by the terminal from N configured random access process types, the N random access process types include at least a random access process in which user plane data can be sent or received, and N is an integer greater than 1; and
the first random access request resource is a random access request resource selected by the terminal from random access request resources corresponding to the N configured random access process types.

Optionally, the radio frequency unit 701 is further configured to:
receive configuration information before the random access request information corresponding to the first random access process type is sent on the first random access request resource, where the configuration information is used to configure the N random access process types and the random access request resources corresponding to the N random access process types.

Optionally, the processor 710 is configured to perform at least one of the following:
selecting the first random access request resource from the random access request resources corresponding to the N random access process types according to a first selection rule; and
selecting the first random access process type from the N random access process types according to a second selection rule.

Optionally, the first random access request resource includes M types of resources, and M is a positive integer.
The processor 710 is further configured to perform at least one of the following:
after K types of resources in the first random access request resource are selected according to the first selection rule, selecting the first random access process type from the N random access process types according to the second selection rule, where K is a positive integer less than or equal to M; and
after the first random access process type is selected according to the second selection rule, selecting the first random access request resource from the random access request resources corresponding to the N random access process types according to the first selection rule.

Optionally, in a case that K is less than M, the processor 710 is further configured to:
select a resource in the first random access request resource other than the K types of resources according to the first selection rule.

Optionally, the processor 710 is further configured to:
after the K types of resources in the first random access request resource are selected according to the first selection rule, select the first random access process type from a random access process type corresponding to the first random access request resource according to the second selection rule.

Optionally, the processor 710 is further configured to:
after the K types of resources in the first random access request resource are selected according to the first selection rule, select a second random access process type from the N random access process types according to the second selection rule; and
in a case that a random access request resource corresponding to the second random access process type does not overlap the K types of resources, select the first random access process type from random access process types corresponding to the K types of resources according to the second selection rule.

Optionally, the processor 710 is further configured to:
after the first random access process type is selected according to the second selection rule, select the first random access request resource from a random access request resource corresponding to the first random access process type according to the first selection rule.

Optionally, the processor 710 is further configured to:
after the first random access process type is selected according to the second selection rule, select a second random access request resource from the random access request resources corresponding to the N random access process types according to the first selection rule; and
in a case that the second random access request resource does not overlap the random access request resource corresponding to the first random access process type, select the first random access request resource from the random access request resource corresponding to the first random access process type according to the first selection rule.

Optionally, the processor 710 is further configured to perform at least one of the following:
selecting the first random access process type from the N random access process types based on a signal measurement threshold;
selecting the first random access process type from the N random access process types based on a data size;
selecting the first random access process type from the N random access process types based on a random number; and
selecting the first random access process type from the N random access process types based on a priority of a random access process type.

Optionally, the random access request resources corresponding to the N random access process types include at least one type of the following resources:
a time-frequency resource corresponding to a random access request;
a downlink signal corresponding to a random access request;
a cell corresponding to a random access request;
an uplink carrier corresponding to a random access request; and
a coding resource corresponding to a random access request.

Optionally, the N random access process types include at least two of the following random access process types:
a random access process in which user plane data cannot be received or sent;
a 4-step random access process in which user plane data can be sent in a third message;

a 4-step random access process in which user plane data can be sent on a data carrier in a third message;

a 4-step random access process in which user plane data can be sent on a signaling carrier in a third message;

a 4-step random access process in which user plane data can be received in a fourth message;

a 4-step random access process in which user plane data can be received on a data carrier in a fourth message;

a 4-step random access process in which user plane data can be received on a signaling carrier in a fourth message;

a 2-step random access process in which user plane data can be sent in a first message;

a 2-step random access process in which user plane data can be sent on a data carrier in a first message;

a 2-step random access process in which user plane data can be sent on a signaling carrier in a first message;

a 2-step random access process in which user plane data can be received in a second message;

a 2-step random access process in which user plane data can be received on a data carrier in a second message; and a 2-step random access process in which user plane data can be received on a signaling carrier in a second message.

It should be noted that in this embodiment, the foregoing terminal 700 can implement the processes in the method embodiment in the embodiments of the present disclosure, and achieve a same beneficial effect. To avoid repetition, details are not described herein again.

It should be understood that, in this embodiment of the present disclosure, the radio frequency unit 701 may be configured to receive and send information or a signal in a call process. Specifically, after receiving downlink data from a base station, the radio frequency unit 701 sends the downlink data to the processor 710 for processing. In addition, the radio frequency unit 701 sends uplink data to the base station. Usually, the radio frequency unit 701 includes but is not limited to an antenna, at least one amplifier, a transceiver, a coupler, a low noise amplifier, a duplexer, and the like. In addition, the radio frequency unit 701 may communicate with a network and another device through a wireless communication system.

The terminal provides wireless broadband Internet access for the user by using the network module 702, for example, helping the user to send and receive an e-mail, brows a web page, and access streaming media.

The audio output unit 703 may convert audio data received by the radio frequency unit 701 or the network module 702 or stored in the memory 709 into an audio signal and output the audio signal as a sound. In addition, the audio output unit 703 may further provide an audio output (for example, a call signal received voice, or a message received voice) related to a specific function implemented by the terminal 700. The audio output unit 703 includes a speaker, a buzzer, a telephone receiver, and the like.

The input unit 704 is configured to receive an audio signal or a video signal. The input unit 704 may include a graphics processing unit (Graphics Processing Unit, GPU) 7041 and a microphone 7042, and the graphics processing unit 7041 processes image data of a still picture or video obtained by an image capture apparatus (such as a camera) in a video capture mode or an image capture mode. A processed image frame may be displayed on the display unit 706. The image frame processed by the graphics processing unit 7041 may be stored in the memory 709 (or another storage medium) or sent by using the radio frequency unit 701 or the network module 702. The microphone 7042 may receive a sound and can process such sound into audio data. Processed audio data may be converted, in a call mode, into a format that can be sent to a mobile communication base station by using the radio frequency unit 701 for output.

The terminal 700 further includes at least one type of sensor 705, such as a light sensor, a motion sensor, and another sensor. Specifically, the light sensor includes an ambient light sensor and a proximity sensor. The ambient light sensor may adjust luminance of the display panel 7061 based on brightness of ambient light. The proximity sensor may turn off the display panel 7061 and/or backlight when the terminal 700 moves to an ear. As a type of the motion sensor, an accelerometer sensor may detect an acceleration value in each direction (generally, three axes), and detect a value and a direction of gravity when the accelerometer sensor is static, and may be used for recognizing a terminal posture (such as screen switching between landscape and portrait modes, a related game, or magnetometer posture calibration), a function related to vibration recognition (such as a pedometer or a knock), and the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information entered by a user or information provided for a user. The display unit 706 may include a display panel 7061. The display panel 7061 may be configured in a form of a liquid crystal display (Liquid Crystal Display, LCD), an organic light-emitting diode (Organic Light-Emitting Diode, OLED), or the like.

The user input unit 707 may be configured to receive input numeral or character information, and generate key signal input related to user setting and functional control of the terminal. Specifically, the user input unit 707 includes a touch panel 7071 and another input device 7072. The touch panel 7071 is also referred to as a touchscreen, and may collect a touch operation performed by a user on or near the touch panel 7071 (such as an operation performed by a user on the touch panel 7071 or near the touch panel 7071 by using any proper object or accessory, such as a finger or a stylus). The touch panel 7071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 710, and receives and executes a command sent by the processor 710. In addition, the touch panel 7071 may be of a resistive type, a capacitive type, an infrared type, a surface acoustic wave type, or the like. The user input unit 707 may include the another input device 7072 in addition to the touch panel 7071. Specifically, the another input device 7072 may include but is not limited to a physical keyboard, a functional button (such as a volume control button or a power on/off button), a trackball, a mouse, and a joystick. Details are not described herein.

Further, the touch panel 7071 may cover the display panel 7061. When detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. In FIG. 7, although the touch panel 7071 and the display panel 7061 are used as two independent parts to implement input and output functions of the terminal, in some embodiments, the touch panel 7071 and the display panel 7061 may be integrated to implement the input and output functions of the terminal. This is not specifically limited herein.

The interface unit 708 is an interface for connecting an external apparatus with the terminal 700. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 708 may be configured to receive input (for example, data information and power) from an external apparatus and transmit the received input to one or more elements in the terminal 700 or may be configured to transmit data between the terminal 700 and an external apparatus.

The memory 709 may be configured to store a software program and various data. The memory 709 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 709 may include a high-speed random access memory, and may further include a nonvolatile memory, for example, at least one magnetic disk storage device, a flash storage device, or another volatile solid-state storage device.

The processor 710 is a control center of the terminal, and connects all parts of the entire terminal by using various interfaces and lines. By running or executing a software program and/or a module stored in the memory 709 and invoking data stored in the memory 709, the processor 710 performs various functions of the terminal and data processing, to perform overall monitoring on the terminal. The processor 710 may include one or more processing units. Optionally, an application processor and a modem processor may be integrated into the processor 710. The application processor mainly processes an operating system, a user interface, an application program, and the like. The modem processor mainly processes wireless communications. It can be understood that, alternatively, the modem processor may not be integrated into the processor 710.

The terminal 700 may further include the power supply 711 (such as a battery) that supplies power to each component. Optionally, the power supply 711 may be logically connected to the processor 710 by using a power management system, so as to implement functions such as charging, discharging, and power consumption management by using the power management system.

In addition, the terminal 700 includes some function modules not shown, and details are not described herein.

Optionally, an embodiment of the present disclosure further provides a terminal, including a processor 710, a memory 709, and a computer program that is stored in the memory 709 and that can be run on the processor 710. When the computer program is executed by the processor 710, the processes of the foregoing random access method embodiment are implemented and a same technical effect can be achieved. To avoid repetition, details are not described herein again.

Figure 8:
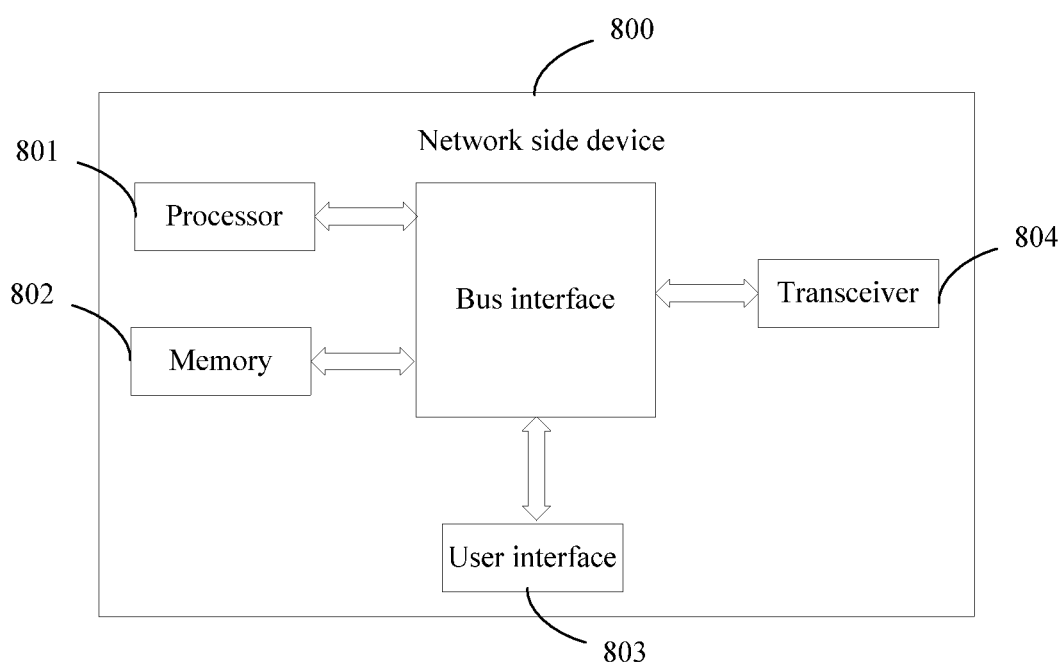
FIG. 8 is a second structural diagram of a network side device according to an embodiment of the present disclosure.

Referring to FIG. 8, FIG. 8 is a second structural diagram of a network side device according to an embodiment of the present disclosure. As shown in FIG. 8, a network side device 800 includes a processor 801, a memory 802, a user interface 803, a transceiver 804, and a bus interface.

In this embodiment of the present disclosure, the network side device 800 further includes a computer program that is stored in the memory 802 and that can be run on the processor 801, and when the computer program is executed by the processor 801, the following steps are implemented:

receiving random access request information corresponding to a first random access process type on a first random access request resource by using the transceiver 804, where the first random access process type corresponds to the first random access request resource;

the first random access process type is a random access process type selected by a terminal from N configured random access process types, the N random access process types include at least a random access process in which user plane data can be sent or received, and N is an integer greater than 1; and the first random access request resource is a random access request resource selected by the terminal from random access request resources corresponding to the N configured random access process types.

In FIG. 8, a bus architecture may include any quantity of interconnected buses and bridges. Specifically, various circuits of one or more processors represented by the processor 801 and a memory represented by the memory 802 are interconnected. The bus architecture may further link various other circuits such as a peripheral device, a voltage regulator, and a power management circuit. These are well known in the art, and therefore are not further described in this specification. A bus interface provides an interface. The transceiver 804 may be a plurality of components. To be specific, the transceiver 804 includes a transmitter and a receiver, and provides a unit configured to communicate with various other apparatuses on a transmission medium. For different user equipment, a user interface 803 may be an interface that can externally or internally connect to a needed device, and the connected device includes but is not limited to a keypad, a display, a loudspeaker, a microphone, and a joystick.

The processor 801 is responsible for bus architecture management and general processing. The memory 802 may store data used by the processor 2601 when the processor 801 performs an operation.

Optionally, when the computer program is executed by the processor 801, the following step is further implemented:

sending configuration information by using the transceiver 804 before the random access request information corresponding to the first random access process type is received on the first random access request resource by using the transceiver 804, where the configuration information is used to configure the N random access process types and the random access request resources corresponding to the N random access process types.

Optionally, the random access request resources corresponding to the N random access process types include at least one type of the following resources:

a time-frequency resource corresponding to a random access request;

a downlink signal corresponding to a random access request;

a cell corresponding to a random access request;

an uplink carrier corresponding to a random access request; and a coding resource corresponding to a random access request.

Optionally, the N random access process types include at least two of the following random access process types:

a random access process in which user plane data cannot be received or sent;

a 4-step random access process in which user plane data can be sent in a third message;

a 4-step random access process in which user plane data can be sent on a data carrier in a third message;

a 4-step random access process in which user plane data can be sent on a signaling carrier in a third message;

a 4-step random access process in which user plane data can be received in a fourth message;

a 4-step random access process in which user plane data can be received on a data carrier in a fourth message;

a 4-step random access process in which user plane data can be received on a signaling carrier in a fourth message;

a 2-step random access process in which user plane data can be sent in a first message;

a 2-step random access process in which user plane data can be sent on a data carrier in a first message;

a 2-step random access process in which user plane data can be sent on a signaling carrier in a first message;

a 2-step random access process in which user plane data can be received in a second message;

a 2-step random access process in which user plane data can be received on a data carrier in a second message; and a 2-step random access process in which user plane data can be received on a signaling carrier in a second message.

The network side device 800 can implement the processes implemented by the network side device in the foregoing method embodiment. To avoid repetition, details are not described herein again.

An embodiment of the present disclosure further provides a computer-readable storage medium. The computer-readable storage medium stores a computer program, and when the computer program is executed by a processor, the processes of the foregoing random access method embodiment or the foregoing configuration method embodiment are implemented and a same technical effect can be achieved. To avoid repetition, details are not described herein again. The computer-readable storage medium includes a read-only memory (Read-only Memory, ROM), a random access memory (Random Access Memory, RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A random access method, applied to a terminal and comprising:

sending random access request information corresponding to a first random access process type on a first random access request resource, wherein the first random access process type corresponds to the first random access request resource;

the first random access process type is a random access process type selected by the terminal from N configured random access process types, the N random access process types comprise at least a random access process in which user plane data can be sent or received, and N is an integer greater than 1; and the first random access request resource is a random access request resource selected by the terminal from random access request resources corresponding to the N configured random access process types;

wherein the first random access request resource comprises M types of resources, and M is a positive integer; and the method further comprises any one of the following:

after K types of resources in the first random access request resource are selected according to a first selection rule, selecting the first random access process type from the N random access process types according to a second selection rule, wherein K is a positive integer less than or equal to M; and after the first random access process type is selected according to the second selection rule, selecting the first random access request resource from the random access request resources corresponding to the N random access process types according to the first selection rule.

2. The method according to claim 1, wherein before the sending random access request information corresponding to a first random access process type on a first random access request resource, the method further comprises:

receiving configuration information, wherein the configuration information is used to configure the N random access process types and the random access request resources corresponding to the N random access process types.

3. The method according to claim 1, wherein before the sending random access request information on a first random access request resource, the method further comprises at least one of the following:

selecting the first random access request resource from the random access request resources corresponding to the N random access process types according to a first selection rule; and
selecting the first random access process type from the N random access process types according to a second selection rule.

4. The method according to claim 1, wherein in a case that K is less than M, the selecting the first random access request resource from the random access request resources corresponding to the N random access process types according to the first selection rule comprises:
selecting a resource in the first random access request resource other than the K types of resources according to the first selection rule.

5. The method according to claim 1, wherein the selecting the first random access process type from the N random access process types according to a second selection rule comprises:
selecting the first random access process type from a random access process type corresponding to the first random access request resource according to the second selection rule.

6. The method according to claim 5, wherein before the selecting the first random access process type from a random access process type corresponding to the first random access request resource according to the second selection rule, the method further comprises:
selecting a second random access process type from the N random access process types according to the second selection rule; and
the selecting the first random access process type from a random access process type corresponding to the first random access request resource according to the second selection rule comprises:
in a case that a random access request resource corresponding to the second random access process type does not overlap the K types of resources, selecting the first random access process type from random access process types corresponding to the K types of resources according to the second selection rule.

7. The method according to claim 1, wherein the selecting the first random access request resource from the random access request resources corresponding to the N random access process types according to a first selection rule comprises:
selecting the first random access request resource from a random access request resource corresponding to the first random access process type according to the first selection rule.

8. The method according to claim 7, wherein before the selecting the first random access request resource from a random access request resource corresponding to the first random access process type according to the first selection rule, the method further comprises:
selecting a second random access request resource from the random access request resources corresponding to the N random access process types according to the first selection rule; and
the selecting the first random access request resource from a random access request resource corresponding to the first random access process type according to the first selection rule comprises:
in a case that the second random access request resource does not overlap the random access request resource corresponding to the first random access process type, selecting the first random access request resource from the random access request resource corresponding to the first random access process type according to the first selection rule.

9. The method according to claim 1, wherein the selecting the first random access process type from the N random access process types according to a second selection rule comprises at least one of the following:
selecting the first random access process type from the N random access process types based on a signal measurement threshold;
selecting the first random access process type from the N random access process types based on a data size;
selecting the first random access process type from the N random access process types based on a random number; and
selecting the first random access process type from the N random access process types based on a priority of a random access process type.

10. The method according to claim 1, wherein the random access request resources corresponding to the N random access process types comprise at least one type of the following resources:
a time-frequency resource corresponding to a random access request;
a downlink signal corresponding to a random access request;
a cell corresponding to a random access request;
an uplink carrier corresponding to a random access request; and
a coding resource corresponding to a random access request.

11. The method according to claim 1, wherein the N random access process types comprise at least two of the following random access process types:
a random access process in which user plane data cannot be received or sent;
a 4-step random access process in which user plane data can be sent in a third message;
a 4-step random access process in which user plane data can be sent on a data carrier in a third message;
a 4-step random access process in which user plane data can be sent on a signaling carrier in a third message;
a 4-step random access process in which user plane data can be received in a fourth message;
a 4-step random access process in which user plane data can be received on a data carrier in a fourth message;
a 4-step random access process in which user plane data can be received on a signaling carrier in a fourth message;
a 2-step random access process in which user plane data can be sent in a first message;
a 2-step random access process in which user plane data can be sent on a data carrier in a first message;
a 2-step random access process in which user plane data can be sent on a signaling carrier in a first message;
a 2-step random access process in which user plane data can be received in a second message;
a 2-step random access process in which user plane data can be received on a data carrier in a second message; and
a 2-step random access process in which user plane data can be received on a signaling carrier in a second message.

12. A terminal, comprising a processor, a memory, and a computer program that is stored in the memory and that can be run on the processor, wherein when the computer program is executed by the processor, the following steps are implemented:

sending random access request information corresponding to a first random access process type on a first random access request resource, wherein the first random access process type corresponds to the first random access request resource;

the first random access process type is a random access process type selected by the terminal from N configured random access process types, the N random access process types comprise at least a random access process in which user plane data can be sent or received, and N is an integer greater than 1; and the first random access request resource is a random access request resource selected by the terminal from random access request resources corresponding to the N configured random access process types;

wherein the first random access request resource comprises M types of resources, and M is a positive integer; and the processor is further configured to perform any one of the following:

after K types of resources in the first random access request resource are selected according to a first selection rule, selecting the first random access process type from the N random access process types according to a second selection rule, wherein K is a positive integer less than or equal to M; and after the first random access process type is selected according to the second selection rule, selecting the first random access request resource from the random access request resources corresponding to the N random access process types according to the first selection rule.

13. The terminal according to claim 12, wherein before the sending random access request information corresponding to a first random access process type on a first random access request resource, the steps implemented when the computer program is executed by the processor further comprises:

receiving configuration information, wherein the configuration information is used to configure the N random access process types and the random access request resources corresponding to the N random access process types.

14. A non-transitory computer-readable storage medium, wherein the computer-readable storage medium stores a computer program, and when the computer program is executed by a processor, a random access method is implemented, the method comprises:

sending random access request information corresponding to a first random access process type on a first random access request resource, wherein the first random access process type corresponds to the first random access request resource;

the first random access process type is a random access process type selected by the terminal from N configured random access process types, the N random access process types comprise at least a random access process in which user plane data can be sent or received, and N is an integer greater than 1; and the first random access request resource is a random access request resource selected by the terminal from random access request resources corresponding to the N configured random access process types;

wherein the first random access request resource comprises M types of resources. and M is a positive integer; and the method further comprises any one of the following:

after K types of resources in the first random access request resource are selected according to a first selection rule, selecting the first random access process type from the N random access process types according to a second selection rule, wherein K is a positive integer less than or equal to M; and after the first random access process type is selected according to the second selection rule, selecting the first random access request resource from the random access request resources corresponding to the N random access process types according to the first selection rule.

* * * * *